United States Patent
Whittlesey

(10) Patent No.: US 9,669,952 B2
(45) Date of Patent: Jun. 6, 2017

(54) SYSTEMS WITH WHEEL SADDLES THAT CAN COOPERATE WITH WHEELS OF ENCODERS AND RELATED DEVICES AND METHODS

(71) Applicant: Tipper Tie, Inc., Apex, NC (US)

(72) Inventor: Thomas E. Whittlesey, Durham, NC (US)

(73) Assignee: Tipper Tie, Inc., Apex, NC (US)

( * ) Notice: Subject to any disclaimer, the term of this patent is extended or adjusted under 35 U.S.C. 154(b) by 0 days.

(21) Appl. No.: 14/862,766

(22) Filed: Sep. 23, 2015

(65) Prior Publication Data

US 2016/0122048 A1 May 5, 2016

Related U.S. Application Data

(60) Provisional application No. 62/073,274, filed on Oct. 31, 2014.

(51) Int. Cl.

| | | |
|---|---|---|
| B65B 9/20 | (2012.01) | |
| A22C 11/02 | (2006.01) | |
| B65B 25/06 | (2006.01) | |
| B65B 57/04 | (2006.01) | |
| B65B 9/213 | (2012.01) | |
| B65B 9/22 | (2006.01) | |

(52) U.S. Cl.
CPC ........ *B65B 9/2021* (2013.01); *A22C 11/0245* (2013.01); *B65B 9/2028* (2013.01); *B65B 9/213* (2013.01); *B65B 9/22* (2013.01); *B65B 25/065* (2013.01); *B65B 57/04* (2013.01)

(58) Field of Classification Search
CPC .................................................... B65B 9/2021
USPC .............................................. 318/3, 34, 558
See application file for complete search history.

(56) References Cited

U.S. PATENT DOCUMENTS

| | | |
|---|---|---|
| 3,543,378 A | 12/1970 | Klenz |
| 4,675,945 A | 6/1987 | Evans et al. |
| 4,847,953 A | 7/1989 | Evans et al. |
| 4,860,522 A * | 8/1989 | Cherney ................. B65B 57/04 53/451 |
| 5,067,313 A | 11/1991 | Evans |
| 5,074,386 A | 12/1991 | Evans |
| 5,085,036 A | 2/1992 | Evans |
| 5,167,567 A | 12/1992 | Evans |
| 5,181,302 A | 1/1993 | Evans |
| 5,203,760 A | 4/1993 | Chen et al. |
| 5,573,454 A | 11/1996 | Fox et al. |
| 6,148,747 A * | 11/2000 | Deckler ................... A01C 5/06 111/137 |
| 6,301,862 B1 * | 10/2001 | Yuyama ................. B65H 16/04 242/421.4 |
| 6,401,885 B1 | 6/2002 | Whittlesey |

(Continued)

FOREIGN PATENT DOCUMENTS

JP    2008137660    6/2008

*Primary Examiner* — David S Luo
(74) *Attorney, Agent, or Firm* — Christensen O'Connor Johnson Kindness PLLC

(57) ABSTRACT

Methods, computer program products and apparatus for producing encased products use a rotary encoder with a measuring wheel, the measuring wheel residing against a depression of a wheel saddle that has a shape that curves inward with a radius of curvature that corresponds to an outer perimeter radius of a cooperating measuring wheel.

22 Claims, 10 Drawing Sheets

(56) References Cited

U.S. PATENT DOCUMENTS

| | | | |
|---|---|---|---|
| 6,968,254 B2 * | 11/2005 | Tochigi | B21D 13/04 226/24 |
| 8,882,570 B2 | 11/2014 | Hanten | |
| 2006/0040602 A1 | 2/2006 | Stall et al. | |
| 2007/0028565 A1 | 2/2007 | May et al. | |
| 2008/0092491 A1 | 4/2008 | Kinoshita | |
| 2008/0274681 A1 | 11/2008 | Hanten | |
| 2012/0142261 A1 | 6/2012 | Hanten | |

* cited by examiner

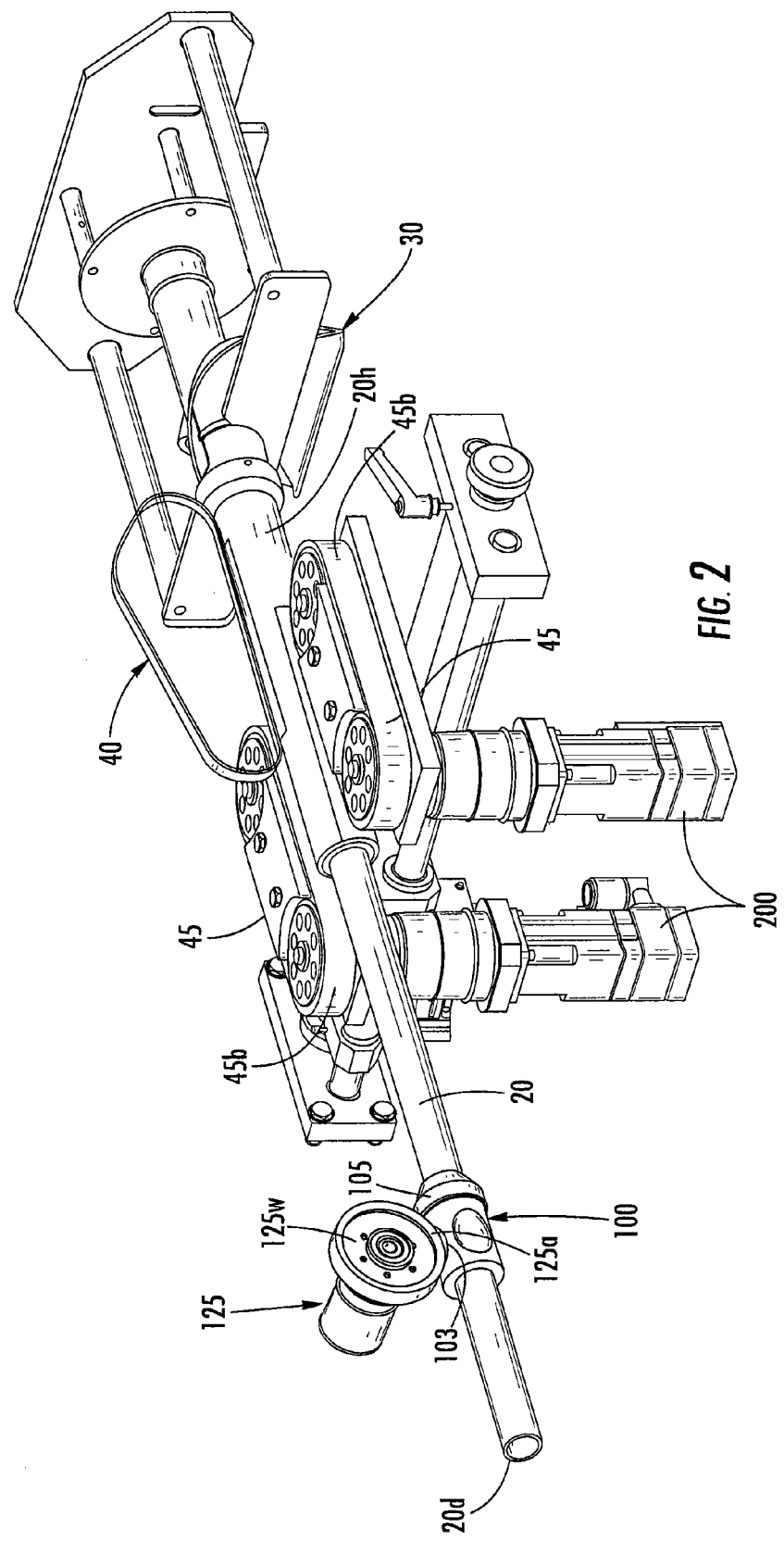

US 9,669,952 B2

SYSTEMS WITH WHEEL SADDLES THAT CAN COOPERATE WITH WHEELS OF ENCODERS AND RELATED DEVICES AND METHODS

RELATED APPLICATIONS

This application claims the benefit of and priority to U.S. Provisional Application Ser. No. 62/073,274 filed Oct. 31, 2014, the contents of which are hereby incorporated by reference as if recited in full herein.

FIELD OF THE INVENTION

The present invention relates to packaging devices, apparatus, systems and methods.

BACKGROUND OF THE INVENTION

Conventionally, in the production of consumer goods such as, for example, pasty food or non-food products, such products are pumped or stuffed into a casing in a manner that allows the casing to fill with a desired amount of the product. One type of casing is a heat-sealed tubular casing formed by sealing a thin sheet of flexible material, typically elastomeric material, into a cylindrical form. U.S. Pat. Nos. 5,085,036 and 5,203,760 describe examples of automated, high-speed contact sealing apparatus forming flat roll stock into tubular casings. The contents of these patents are hereby incorporated by reference as if recited in full herein.

SUMMARY OF EMBODIMENTS OF THE INVENTION

Methods, wheel saddles, computer program products and apparatus are described. Embodiments of the invention can be used to produce encased products using a rotary encoder with a measuring wheel. The measuring wheel can reside against a depression of a wheel saddle that has a shape that curves inward with a radius of curvature that corresponds to an outer perimeter radius of a cooperating measuring wheel.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

These and other objects and/or aspects of the present invention are explained in detail in the specification set forth below.

BRIEF DESCRIPTION OF THE DRAWINGS

FIG. 2 is a front perspective view of a film sensor configuration according to embodiments of the present invention.

FIG. 10B shows the measurements when a wheel saddle is used according to embodiments of the present invention. FIG. 10A shows the measurements when a wheel saddle is not sued.

DETAILED DESCRIPTION

Figure 1:
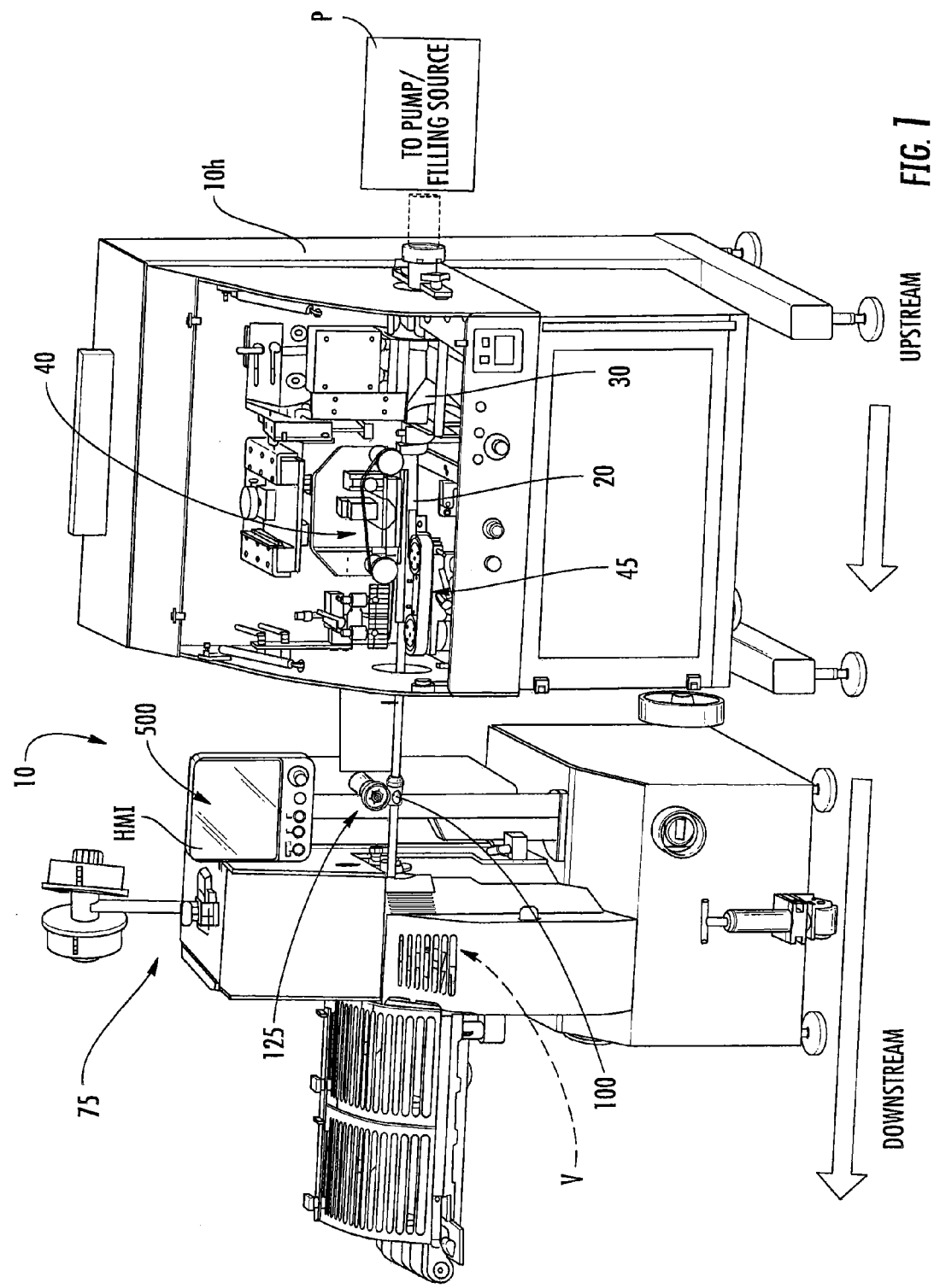
FIG. 1 is a front perspective view of an exemplary packaging machine according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. The term "Fig." (whether in all capital letters or not) is used interchangeably with the word "Figure" as an abbreviation thereof in the specification and drawings. In addition, the sequence of operations (or steps) is not limited to the order presented in the claims unless specifically indicated otherwise.

The term "concurrently" means that the operations are carried out substantially simultaneously.

The term "about" means that the noted value can vary by +/−20%.

It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected to the other element or intervening elements may be present. In contrast, when a feature or element is referred to as being "directly connected", "directly attached" or "directly coupled" to another element, there are no intervening elements present. The phrase "in communication with" refers to direct and indirect communication. Although described or shown with respect to one embodiment, the features so described or shown can apply to other embodiments.

The term "circuit" refers to software embodiments or embodiments combining software and hardware aspects, features and/or components, including, for example, at least one processor and software associated therewith embedded therein and/or executable by and/or one or more Application Specific Integrated Circuits (ASICs), for programmatically directing and/or performing certain described actions, operations or method steps. The circuit can reside in one location or multiple locations, it may be integrated into one component or may be distributed, e.g., it may reside entirely in or supported by a workstation or cabinet (e.g., HMI of a machine) or single computer, partially in one workstation, cabinet, processor or computer, or totally in a remote location away from a local computer, processor, workstation or cabinet. If the latter, a local computer and/or processor can communicate over a LAN, WAN and/or internet to transmit instructions and/or data.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "frame" means a generally skeletal structure used to support one or more assemblies, modules and/or components. The frame can be a floor mount frame. The term "automated" means that operations can be carried out substantially without manual assistance, typically using programmatically directed control systems and electrical and/or mechanical devices. The term "semi-automatic" means that operator input or assistance may be used but that most operations are carried out automatically using electromechanical devices and programmatically directed control systems.

In the description of embodiments of the present invention that follows, certain terms are employed to refer to the positional relationship of certain structures relative to other structures. As used herein, the term "front" or "forward" and derivatives thereof refer to the general or primary direction that the filler or product travels in a production line to form an encased product; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

The term "servomotor" refers to a closed-loop servomechanism with an electric motor that uses electronic feedback to control its operation. The control can be automatic rather than manual. The servomotor comprises the electric motor, at least one encoder, a controller and driver. The servomotor components can be integrated into a unitary package or distributed. The driver compares a position command and the encoder position/speed information and controls the drive current for the electric motor. The input to the controller includes a signal, either analog or digital, representing the position commanded for the output shaft of the motor. The measured position of the output can be compared to a command position and an external input to the controller. The servomotor can be configured to measure both the position and the speed of the output shaft. The speed of the motor is controlled and, except potentially during short bursts or times, does not run at full-speed during normal operation. The servomotor can operate with a PID protocol to allow the servomotor to be brought to its commanded position more quickly and more precisely. PID controllers can make use of a speed signal. The servomotor encoder can comprise an optical encoder, absolute or incremental, to determine position at power-on. Incremental systems may combine their inherent ability to measure intervals of rotation with a simple zero-position sensor to set their position at start-up. The electric motor can be DC or AC. In some embodiments, the servomotors can be an electronically-commutated brushless motor. In some embodiments, the servomotor can be an AC induction motors with variable frequency drive that allows for control of its speed. In some embodiments, the servomotor is a brushless AC motor with permanent magnet fields.

The present invention is particularly suitable for producing encased products that may also employ closure clips to seal products held in the casings. The product may be a linked chain of elongated pumped, flowed or extruded product held in a casing. The casing can be any suitable casing (edible or inedible, natural or synthetic) such as, but not limited to, collagen, cellulose, plastic, elastomeric and/or polymeric casing. Typically, the casing material comprises planar roll stock of film comprising elastomeric and/or polymeric material. The elastomeric and/or polymeric sheet material is a relatively thin sheet (or film) of roll-stock that can be formed in situ into a continuous length of heat-sealed and/or otherwise joined or seamed tubular casing. Embodiments of the invention are configured to seal laminated or multi-layer films. The multi-layer films can comprise different materials, typically one material as a first layer and a second material as an overlying second layer. The different materials can be laminated or one layer can be a coating such as a metalized spray coating. The laminated or multi-layer films can include "foil film", metalized polymeric and/or elastomeric films, such as aluminized plastic and/or aluminized polymeric films. In some embodiments, the films can comprise heat-shrink films.

The term "film" means the material is thin. The thickness is typically under about 0.5 mm, such as in a range of between about 0.02 mm to about 0.3 mm, typically between about 0.03 mm to about 0.13 mm. In some embodiments, the film can have a thickness that is about 0.03 mm, about 0.04 mm, about 0.05 mm, about 0.06 mm, about 0.07 mm, 0.08 mm, about 0.09 mm, about 0.10 mm, about 0.11 mm, about 0.12 mm, about 0.13 mm, about 0.14 mm, about 0.15 mm, about 0.16 mm, about 0.17 mm, about 0.18 mm, about 0.19 mm, about 0.20 mm, about 0.25 mm, about 0.30 mm and the like. However, the casing can have other thicknesses.

The forming can be carried out substantially automatically and intermittently and/or continuously over a desired interval, typically between at least about 45-60 minutes, depending on the size of the length of the roll stock, pump speed and film drive speed, for example. The sealing can be performed using a heat seal. The seal can seal a seam formed by joining two outer long sides of the casing/film. The seam can be a flat, fin, or other overlapping and/or abutting joint configuration. Where a heat-seal is used a static heat bar or rotating heat band can be used.

The encased elongated or tubular product can be an elongated food product. Exemplary meat products include, but are not limited to, strands of meat (that may comprise pepperoni, poultry, and/or beef or other desired meat), and processed meat products including whole or partial meat mixtures, including sausages, hotdogs, and the like. Other embodiments of the present invention may be directed to seal other types of food (such as cheese) or other product in casing materials. Examples of other products include pasty products such as caulk or powders such as granular materials including grain, sugar, sand and the like or other flowable materials including wet pet food (similar to that held conventionally in cans) or other powder, granular, solid, semi-solid or gelatinous materials including explosives. Thus, embodiments of the invention can be used for packaging target products for any industry including food, aquaculture, agriculture, environmental, building or home maintenance supplies, chemical, explosives, or other applications.

Turning now to FIG. 1, an exemplary packaging apparatus 10 configured to form tubular casings from flat sheet stock is shown. The apparatus 10 includes a horn 20, a forming collar 30, a seal assembly 40 (which as shown comprises a heat-seal heater), a casing drive assembly 45 (which will be referred to hereafter as a "film" drive assembly), a wheel cradle 100 and a rotary encoder 125.

The term "film drive assembly" refers to drive assemblies that drive any casing material on the apparatus, not just film. The film drive assembly 45 can include opposing belts 45b driven by at least one servomotor 200. Typically, each drive belt 45b is driven by a respective servomotor 200.

While the figures illustrate the seal assembly 40 for forming the seal on the casing as a heat-seal assembly, it is also contemplated that other seal assemblies can be used rather than or with the heat-seal heaters, including, for example, adhesive (heated) or tape seal systems as is known to those of skill in the art. Also, while shown with respect to a single clipper system, the packaging system can be a multi-clipper system. See, e.g., U.S. Pat. No. 8,006,463, the contents of which are hereby incorporated by reference as if recited in full herein.

The system 10 typically also includes a clipper 75 and voiders V that cooperate with the clipper 75 to void filling in a segment of tubular package to allow the clipper 75 to apply one or more clips to a filled package to seal a respective package.

FIG. 2 illustrates that the wheel saddle 100 (which can also be descriptively called a "wheel cradle") is in cooperating alignment with a measuring wheel 125w of the rotary encoder 125. The wheel saddle 100 can, in some embodiments, reside downstream of the seal assembly 40 and downstream of the and film drive assembly 45. However, the wheel saddle 100 can be used in any appropriate position, including before the film drive assembly 45 and even upstream of the forming collar 30. Where more than one rotary encoder 125 is used, more than one wheel saddle 100 may be used. The wheel saddle 100 can also be held on any suitable supporting member and is not required to be held by the product horn 20.

Figure 3A:
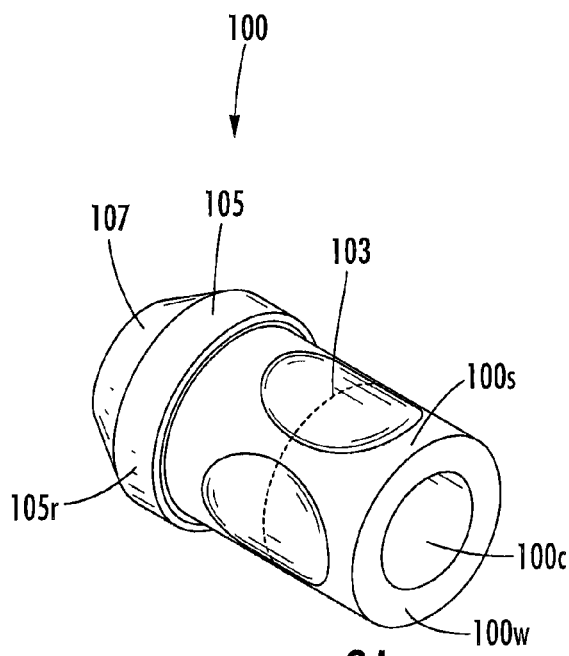
FIG. 3A is a rear perspective view of an exemplary wheel saddle according to embodiments of the present invention.
Figure 3B:
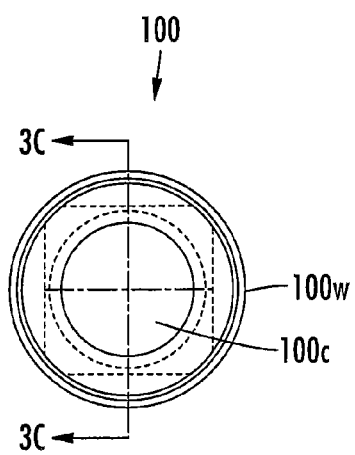
FIG. 3B is an end view of the wheel saddle shown in FIG. 3A.
Figure 4A:
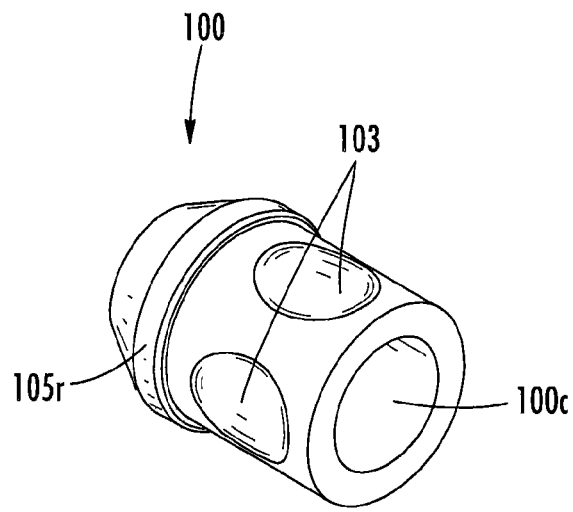
FIG. 4A is a rear perspective view of an exemplary wheel saddle according to embodiments of the present invention.
Figure 4B:
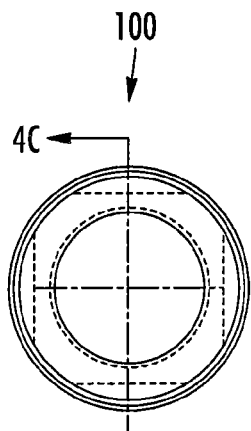
FIG. 4B is an end view of the wheel saddle shown in FIG. 4A.
Figure 5A:
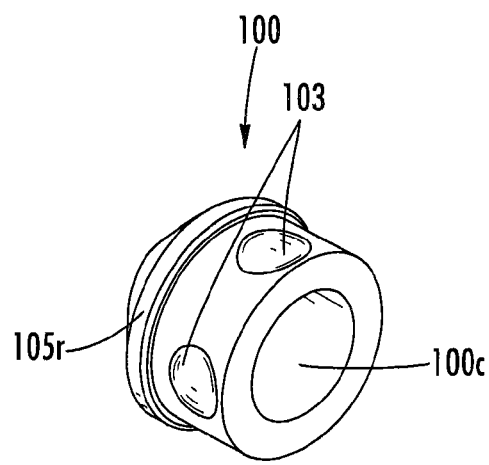
FIG. 5A is a rear perspective view of an exemplary wheel saddle according to embodiments of the present invention.
Figure 5B:
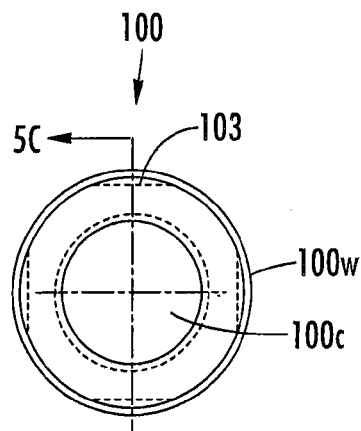
FIG. 5B is an end view of the wheel saddle shown in FIG. 5A.

FIGS. 3A, 4A and 5A illustrate that the wheel saddle 100 has a wall 100w with an outer surface 100s with at least one depression 103 sized and configured as a wheel contact outer surface segment. The depression 103 can curve inward (e.g., be concave) and can be sized and configured to receive, typically snugly abut, a correspondingly sized and shaped arc segment 125a of the wheel 125w (FIG. 2) to provide a larger contact area in comparison to a conventional line contact between the wheel 125w and film or casing F (FIG. 6) pulled, in operation, between the wheel 125w and the wheel cradle depression 103.

Figure 3C:
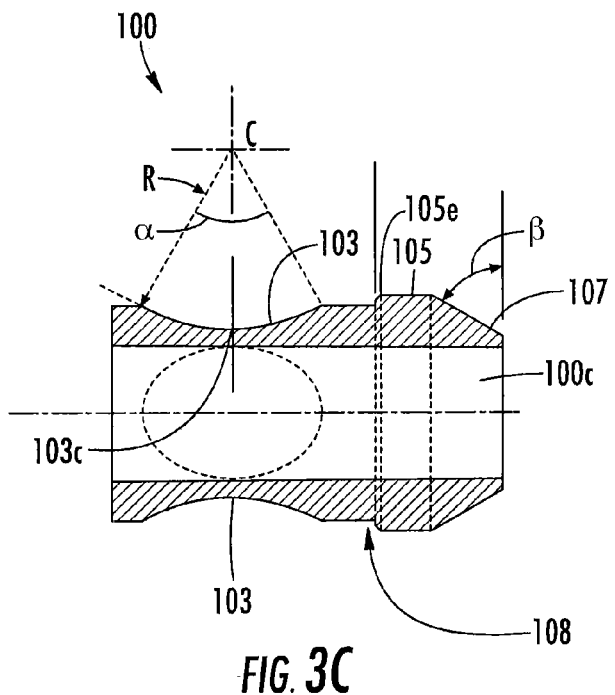
FIG. 3C is a section view taken along line 3C-3C of FIG. 3B.
Figure 4C:
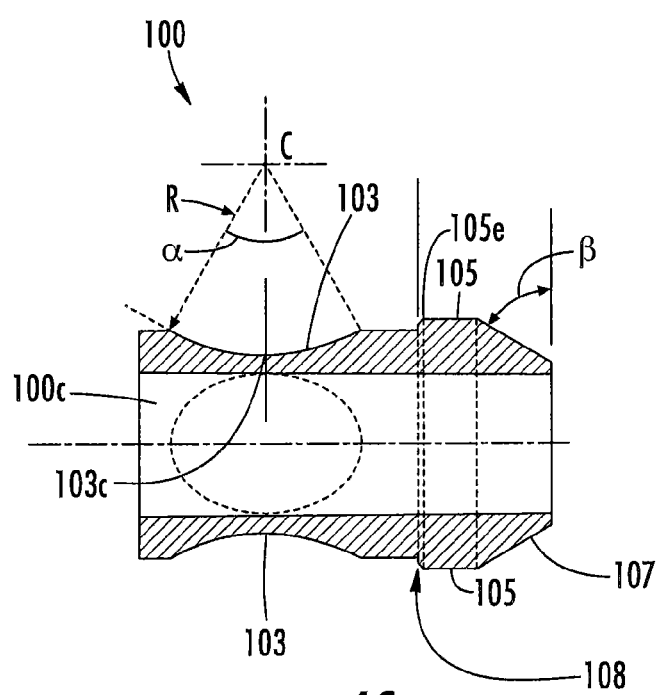
FIG. 4C is a section view taken along line 4C-4C of FIG. 4B.
Figure 5C:
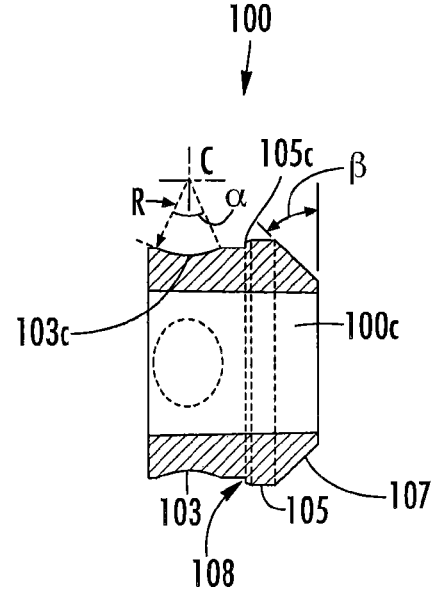
FIG. 5C is a section view taken along line 5C-5C of FIG. 5B.

The wheel saddle 100 can be configured to have a lip 105 on the downstream end and/or be integral with a casing sizing ring 105r that can spread the film outward as it is pulled thereover as is well known to those of skill in the art. However, the casing sizing ring 105 may also be provided as a discrete component and/or the wheel saddle 100 may not include the lip 105. Where there is a lip 105, whether or not part or all of a casing sizing ring 105r, the depression 103 can be positioned to be longitudinally closely spaced apart therefrom. In some embodiments, the edge of the lip 105e adjacent the step 108 is between about 0.5 inches to about 2 inches from a center of a depression 103c defined by a lowest part of the inwardly curved depression, as shown in FIGS. 3C, 4C and 5C, for example.

In some embodiments, the wheel saddle 100 can be attached to the horn 20 or be integral to the horn 20. The wheel saddle 100 can be releasably attachable (removably secured) to the horn via a fixation member such as a fixation screw. The wheel saddle 100 can be affixed into a desired axial or longitudinal position on the horn 20 under the wheel 125w, between the film drive 45 and the voider V.

The at least one depression 103 can have a length that is between about 0.75 inches and about 2 inches, more typically between about 1 inch and about 1.5 inches. The at least one depression 103 can have a shallow depth sized so that it receives only the outer surface of the wheel 125w. The shallow depth can be between about 0.09 inches and about 0.25 inches. However, the length and depth may change based on size and/or shape of a particular measuring wheel 125w.

The depression 103 can be sized and configured to have a contact angle "α" (FIGS. 3C, 4C, 5C, 6) extending from a center "C" of the wheel 125w between opposing ends of the depression (e.g., arc) that is about 20% to about 60% of a circumference of the wheel 125w. In some embodiments, α is about 20%, about 25%, about 30%, about 35%, about 40%, about 45%, about 50%, about 55% or about 60%.

In some embodiments, the depression 103 can have an inwardly curved shape with a radius "R" of curvature measured from an arc center C that is above the surface of the depression of between about 1 inch to about 2 inches, such as about 1.260 inches, in some particular embodiments.

The radius of curvature R can correspond to a radius of an outer perimeter of a cooperating measuring wheel 125w.

FIGS. 3A, 4A and 5A also illustrate that the depression 103 and/or the wheel saddle 100 itself can have different sizes and/or shapes. In the embodiments shown, each wheel saddle 100 is tubular with an open longitudinally extending channel 100c that can receive a portion of a cylindrical horn 20. However, the wheel saddle 100 can have other shapes and is not required to be tubular. For example, the product horn 20 can hold or be formed with a semi-circular shaped wheel saddle 100 that can provide the desired depression 103. For uses with rotary encoders upstream of the forming collar, flat substrates can be configured with a depression 103 (not shown).

As shown in FIGS. 3A, 4A and 5A, the wheel saddle 100 can be provided in different sizes for accommodating different size product horns, such as in at least three sizes corresponding to a 40 mm, 52 mm and 105 mm product horn diameters. There may be many different combinations of outer and inner diameters and these sizes are provided by way of example and without limitation.

The at least one depression 103 of the wheel cradle can have a continuous (closed/solid) surface. However, it is contemplated that the wheel saddle 100 may have one or more apertures, even in the depression 103, as long as the one or more apertures are sized and configured not to impede suitable contact with the wheel for accurate measurement of lengths of film pulled between the wheel 125w and the wheel saddle 100.

In preferred embodiments, the depression 103 has a continuous closed surface and is sufficiently lubricious to facilitate the sliding movement of the film F (FIG. 6) along its outer surface.

It is also noted that while the wheel 125w is shown on top of the wheel saddle 100 in FIGS. 1 and 2, it may be positioned under or even along a side as long as suitable contact force against the depression 103 is provided.

The wheel saddle 100 can be provided with a single depression 103 (FIG. 2, for example) or with a plurality of circumferentially spaced apart depressions 103 as shown in FIGS. 3A, 4A and 5A. The plurality of circumferentially spaced apart depressions 103 can include between 2-5, depending on the diameter of the product horn 20 and/or wheel saddle 100 (where tubular bodies are used), typically 2, 3, or 4. For tubular wheel saddles 100 with multiple spaced apart depressions 103, the centers of the depressions can be circumferentially offset but axially aligned to reside along a common circle connecting each center and extending about the outer wall of the wheel saddle. In other embodiments, the centers of the depressions 103 can be longitudinally and circumferentially offset (not shown). The offset configurations may require positional adjustment of the encoder measuring wheel or the wheel saddle 100 when different depressions are use for proper operative position.

The wheel saddle 100 can be configured to be rotated to present a different depression to the measuring wheel 125w when one depression 103 shows wear or overuse or at defined maintenance intervals. The wheel saddle 100 can be replaced or a respective depression 103 repaired or refinished when new depressions 103 are desired or needed to maintain operational performance. The wheel saddle 100 can be configured with a replaceable wear surface on the depression 103 (not shown).

Where the product horn 20 is configured with an integral wheel saddle 100, it may include one or a plurality of depressions 103 for a respective wheel saddle 100. The product horn 20 itself can be rotated to present a different depressions 103 to an operative position. Product horns 20 or sections thereof can be replaced or repaired when new depressions 103 or new depression wear surfaces are desired.

In some embodiments, the wheel saddle 100 can be configured as a monolithic unitary tubular body as shown in FIGS. 3A, 4A and 5A, for example. In some embodiments, the wheel saddle 100 can be configured as mating, attachable components, such as cooperating shells, for ease in placement, instead of sliding a unitary member onto a product horn 20, where the wheel saddle 100 is used on a product horn 20.

The wheel saddle 100 can be a rigid polymeric member, a rigid metallic member such as aluminum, stainless steel or other suitable material, or combinations thereof. In some embodiments, the wheel saddle 100 and/or depression 103 can comprise ultra-high-molecular-weight polyethylene (UHMWPE, UHMW), which is a subset of the thermoplastic polyethylene, also known as high-modulus polyethylene, (HMPE), or high-performance polyethylene (HPPE). However, ceramics or other materials may be used. Lubricious coatings can be used where needed to provide the desired low friction contact surface. For food packaging uses, suitable materials can be chosen so as to comply with applicable industry regulations.

As shown in FIGS. 3C, 4C and 5C, for example, the wheel saddles 100 can include a tapered leading end 107 (facing away from the voider V) that rises to the lip 105 and/or casing sizing ring 105r, then merges into the at least one depression 103, in the longitudinal direction. The step 108, which is a step down in size between the lip/sizing ring 105 and the wheel saddle adjacent the depression 103 can be between about 0.01 inches to about 0.25 inches, more typically between about 0.01 inches and 0.1 inches. The taper can have an angle "$\beta$" measured from vertical that is between about 30-60 degrees, typically between about 45-60 degrees.

The use of a wheel saddle 100 has unexpectedly provided an improved, more accurate measurement by the rotary encoder 125 with the measuring wheel 125w for lengths of material/casing pulled during certain operations such as, for example, during voiding or clipping when greater tensile forces can pull the film forward and cause the wheel 125w to slip thereby decreasing measurement accuracy.

It is contemplated that the actual measured length of film F pulled forward of the measuring wheel 125 when used with the wheel saddle 100 can be within +/−4% than the actual length, even over multiple (10-100 or more) successive voider operations. In some embodiments, the measurement accuracy is such that, after 100 repetitive voider operations of a supply of film/casing F, the measured length differs from the actual dispensed length by no more than +/−5%, such as no more than +/−1%, +/−2%/+/−3%, +/−4% and +/−5%.

Figure 10A:
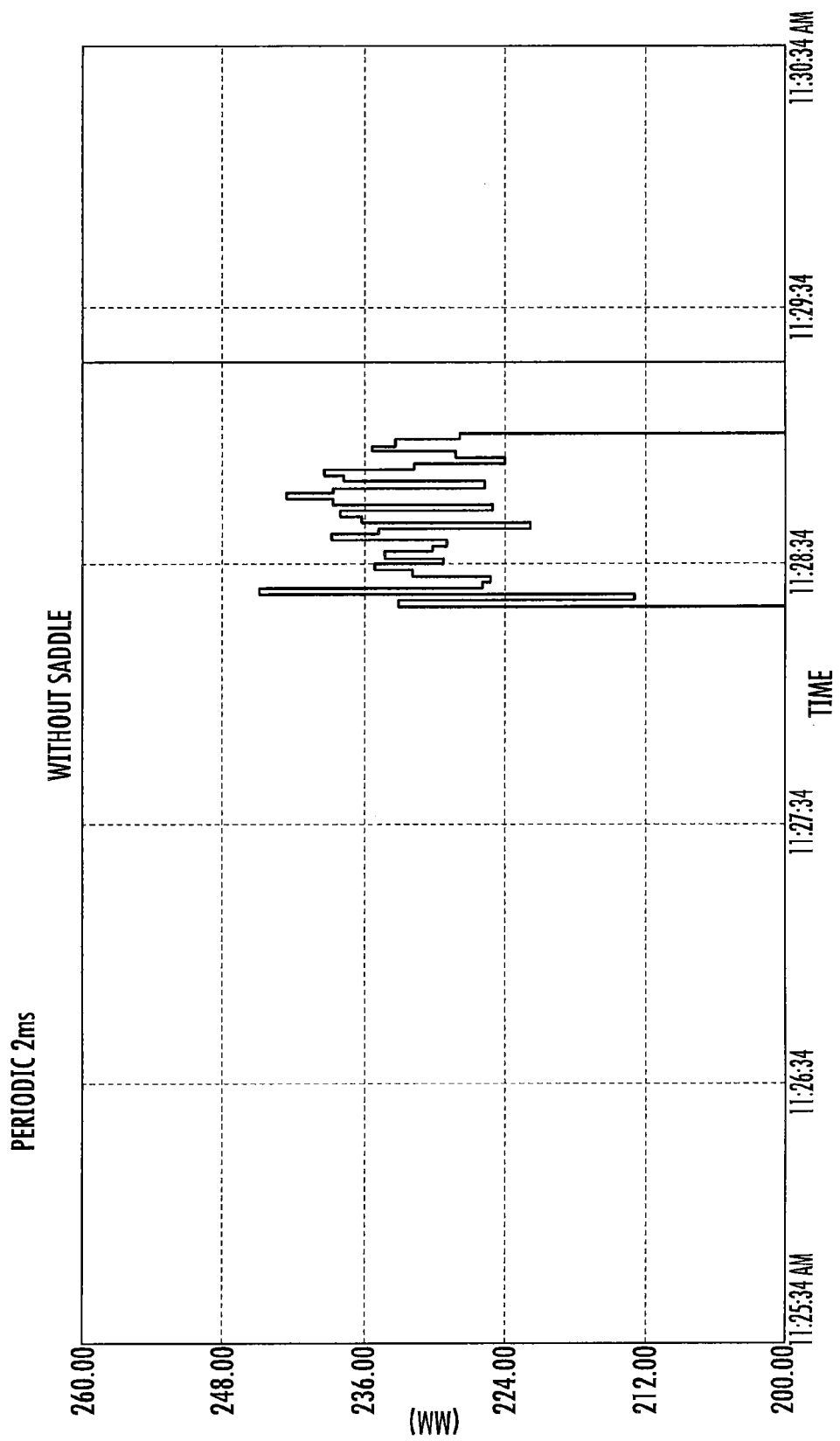
FIGS. 10A and 10B are comparative graphs of encoder-measured film length used per cycle (mm versus milliseconds).
Figure 10B:
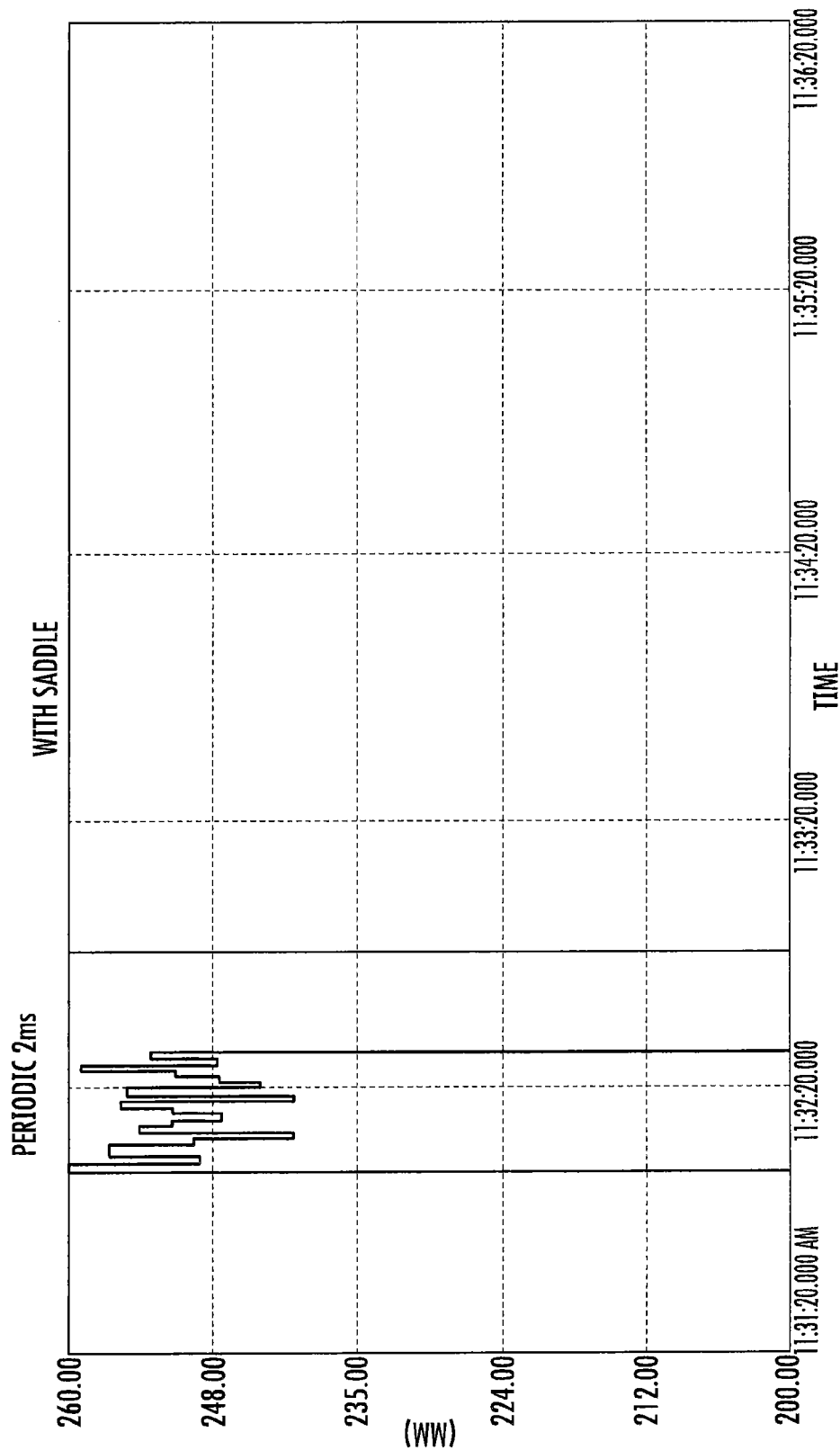

FIGS. 10A and 10B illustrate measurements with and without the wheel saddle 100 illustrating improved measurements per cycle as will be discussed further below.

In some embodiments, the measuring wheel 125w and encoder 125 can generate an acceleration curve that matches that of the voider indicating a more accurate measurement of film during this action.

Figure 6:
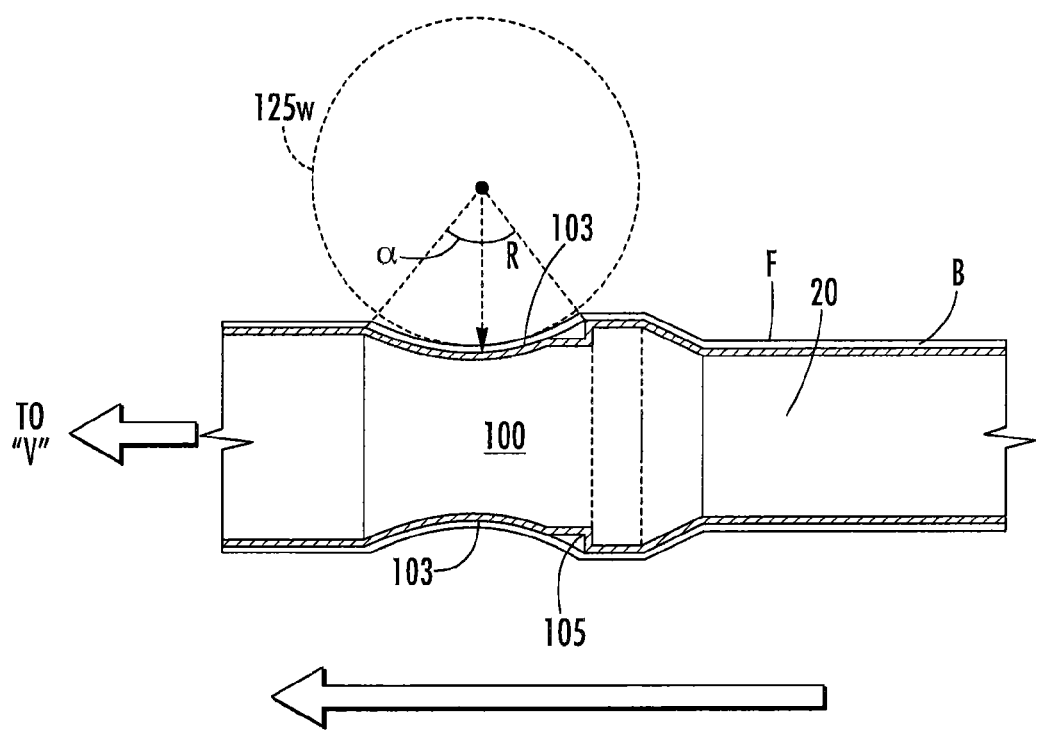
FIG. 6 is a partial schematic illustration of a wheel saddle cooperating with a wheel of a rotary encoder and film therebetween according to embodiments of the present invention.

FIG. 6 schematically illustrates the wheel saddle 100 cooperating with an abutting surface of the measuring wheel with the film F therebetween according to some embodiments of the present invention.

Figure 7:
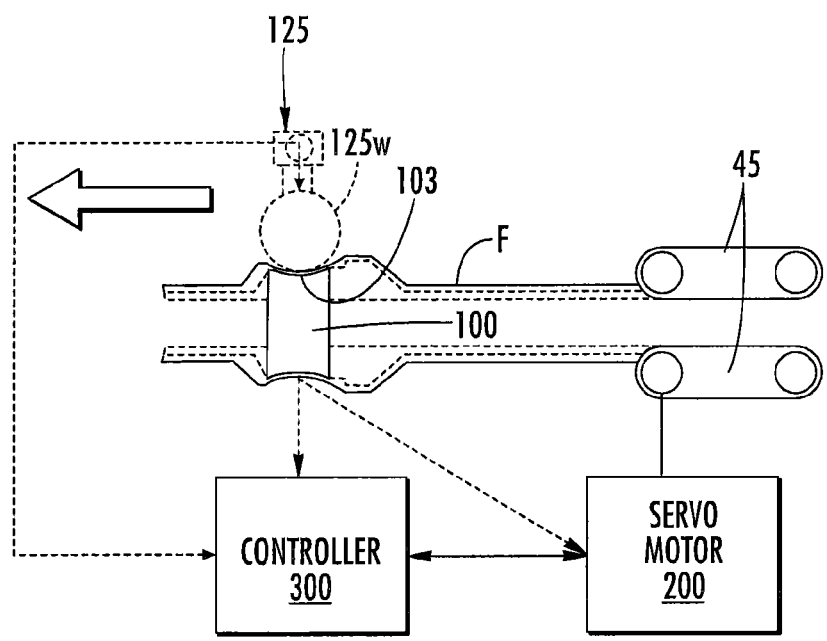
FIG. 7 is a schematic illustration of a control system that can receive input from the rotary encoder to control speed of a film drive according to embodiments of the present invention.

FIG. 7 illustrates that the apparatus 10 can include or be in communication with a controller 300 that is in communication with the rotary encoder 125 and at least one servomotor 200. The servomotor(s) 200 is in communication with the film drive assembly 45 to be able to control casing/film drive speed. The film drive assembly 45 and/or the controller 300 can be in communication with the sealer 40 (e.g., heat-seal heater, tape seal assembly or adhesive seal assembly). The measurement from the rotary encoder measuring wheel 125w residing against a depression 103 of the wheel saddle 100 can be used to adjust the speed of the servomotor(s) 200, and/or seal assembly (such as band speed where a heat seal band is used) or both.

The apparatus 10, using the rotary encoder 125 and the at least one servomotor 200 (FIGS. 2, 7) in communication with the film drive assembly 45, can be configured to operate without requiring a large buffer B (FIG. 6) of sealed tubular casing F. In some embodiments, no buffer B is required. In some embodiments, a limited amount of buffer B is used.

In some embodiments, the system 10 can be configured to produce a small excess amount of tubular sealed casing at the beginning of each roll of flat stock, e.g., between about 1-2 inches.

The system 10 can be configured to inhibit or disallow undue amounts of wrinkle or fold formation (e.g., "crinkling") in the supplied formed tubular casing. This tight control can avoid creases, microfissures, cracks and/or microfractures in fragile casings such as laminated aluminum films.

The film speed and other operational parameters can be selected at set-up. The machine 10 can supply tubular casing F at a defined speed range that can be determined or identified at set-up. This speed can be controlled to produce sealed tubular casing F in respective lengths corresponding to amounts to be successively filled and clipped, but there can be variation during production depending on density of the product, speed of the pump, casing type, product length and speed of the film drive and heat-seal assemblies and the like.

As shown in FIG. 7, the system 10 can include a controller 300 that communicates with the rotary encoder 125 and a servomotor 200 to be able to increase or decrease the speed of the film drive assembly 45

As is well known to those of skill in the art, during voiding, the tubular casing F can be pulled abruptly forward (e.g., jerked rapidly upstream by voiders V) in front of the discharge end of the horn 20d (FIG. 1) when the voiders V close and separate. This action can impair or destroy the heat-seal on the tubular casing if sufficient force is applied to the film upstream, against the pull direction of the voiders.

As also shown in FIG. 2, two servomotors 200 can be used and may be synchronized to have the same speed at the same time. However, a single servomotor 200 can also be used with appropriate gearing and belts, links or other drive inputs from the motor to the film belts 45b. Further, the servomotors 200 can be configured to extend upwardly below the vacuum belts 45b as shown. Alternatively, the servomotor(s) 200 can extend above the belts 45 and even to the sides of respective belts 45b using appropriate gear boxes to direct the rotational input to the belts 45b.

The drive speed can be such that the casing F is advanced over the forming collar 30 and through the heat-seal heater 40 at a speed that is typically between about 20-400 ft/min, more typically between about 20-300 ft/min or between about 20-150 ft/min. In the upper end of this range, e.g., at about 150 ft/min, the long ends (long edges) of the casing are typically under the heat-seal heater 40 for a short time of between about 0.1 second to about 0.5 seconds. At a rate of about 150 ft/min, the exposure to the heat-seal heater 40 is about 0.2 seconds.

In some embodiments, the heat-seal assembly 40 can comprise a heat-band heater that uses a continuously rotating (endless) heat seal-band 40b to seal the seam. U.S. Pat. Nos. 5,085,036 and 5,203,760 describe examples of automated, high-speed contact sealing apparatus forming flat roll stock into tubular film casings. The contents of these patents are hereby incorporated by reference as if recited in full herein. However, it is contemplated that other heat-seal heater configurations or other seal systems may be used. For example, adhesive seal or tape seal systems can be used with or without heat-seal assistance. Where used, the heat-seal heater 40 can comprise rollers or other contact-based seal mechanisms.

The forming collar 30 can also be held in a different orientation from that shown in FIGS. 1, and 2, e.g., rotated to direct the flat casing long edges together along an outer side or the bottom with the seal assembly 40 residing to the side or under the horn 20, respectively.

As noted above, the controller 300 can be configured as or be in communication with a proportional-integral-derivative controller (PID controller) to have a control loop feedback mechanism for varying current or power to the servomotor(s) 200 to maintain a speed and rapidly (instantaneously) increase then decrease speed.

The apparatus 10 can form part of a packaging system that includes a shirred voiding/clipping apparatus located downstream of a respective horn and heat seal assembly 40 to produce an elongated product. The product can be produced in a linked chain of tubular or chub product with clips applied at desired intervals. The length and diameter of each link, chub or discrete product and/or the overall length of the chain can vary depending on the type of product being produced. Examples of typical strand or chain lengths are between about 1-6 feet. See, e.g., U.S. Pat. Nos. 3,543,378, 5,167,567, 5,067,313, and 5,181,302, the contents of which are hereby incorporated by reference as if recited in full herein.

The apparatus 10 can be configured to interchangeably accommodate different size horns 20, wheel saddles 100 and corresponding different size forming collars 30 that form the suitable size casing. For example, the diameters of the horns 20 can range between about ½ inch to about 8 inches, typically between ¾ inches to about 5 inches in defined size increments of ¼ inch, ½ inch or 1 inch, for example, and where replaceable wheel saddles are used, these can be provided in corresponding sizes to accommodate the different horn sizes. The forming collar 30 will have a width that is larger than the corresponding horn and typically has about a 3× width as the corresponding diameter of the tubular casing.

The horn 20 can be configured as internal and external cooperating horns. For example, the internal horn can have a length that extends through an external heat seal horn 20h (FIG. 2). The heat seal horn 20h resides at least under the heat seal assembly 40. The horn 20 may be a single horn that can have a different external shape at the forming collar and/or heat seal assembly 40, such as a flat surface aligned with the heat seal band to facilitate heat seal operation.

Examples of exemplary devices and apparatus used to void, clip or tension casing material are described in U.S. Pat. Nos. 4,847,953; 4,675,945; 5,074,386; 5,167,567; and 6,401,885, the contents of which are hereby incorporated by reference as if recited in full herein. Generally stated, clips can be applied to the casing material to wrap around and close or seal the product therein. The seal formed by the clip against the casing may be sufficiently strong so as to be able to hold a vacuum of about 16 mm Hg for about 24-48 hours. Examples of suitable clips include metallic generally "U"-shaped clips available from Tipper Tie, Inc., in Apex, N.C. Other clips, clip materials and clip configurations may also be used.

Figure 8:
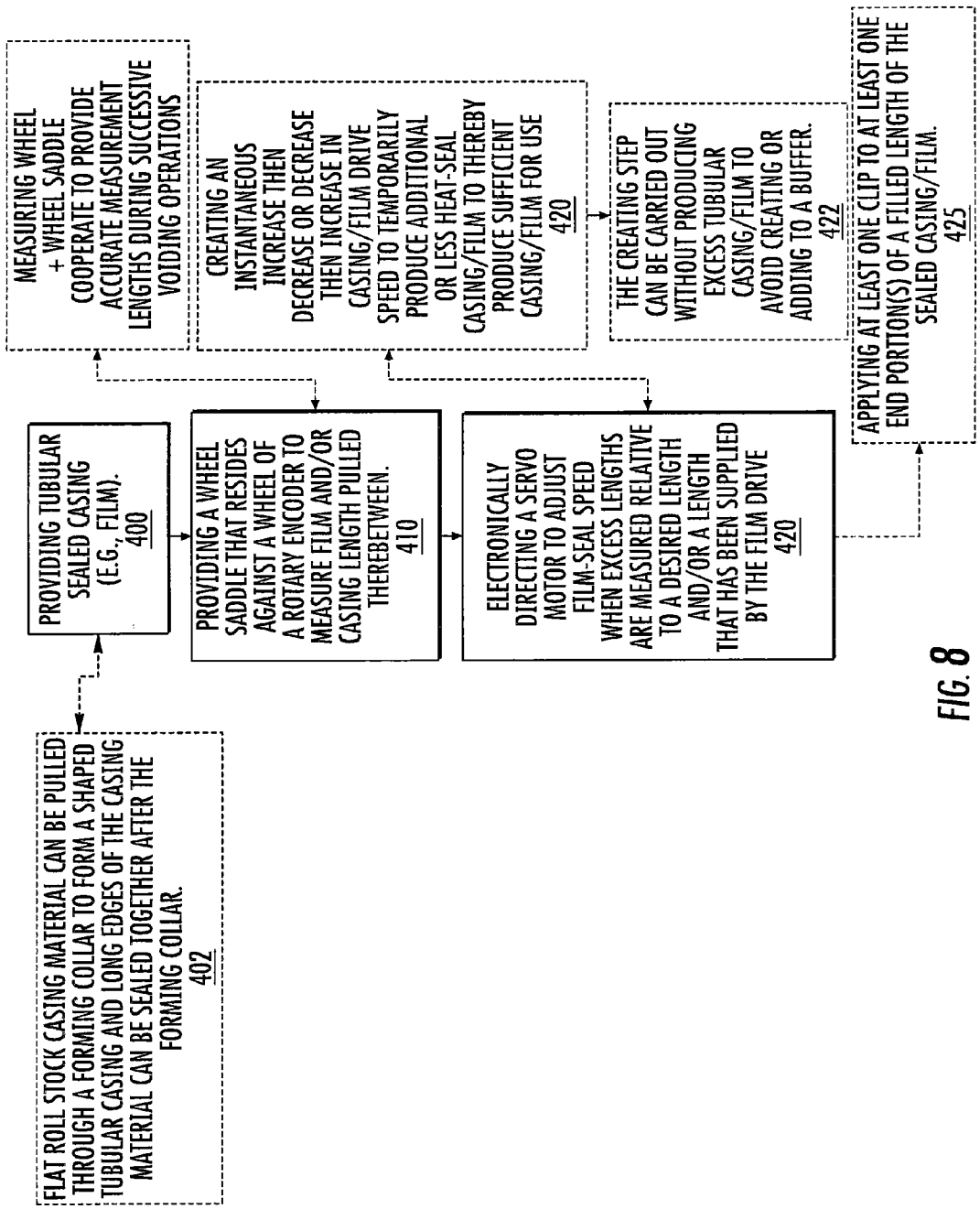
FIG. 8 is a flow chart of operations that may be carried out according to embodiments of the present invention.

FIG. 8 illustrates a method of steps or actions that can be used to carry out embodiments of the present invention. Tubular sealed casing is provided (e.g., film) (block 400). Optionally, the flat roll stock casing material can be pulled through a forming collar to form a shaped tubular casing and long edges of the casing material can be sealed together after the forming collar to provide the tubular sealed casing (block 402).

A measuring wheel of a rotary encoder is placed against a wheel saddle to measure lengths of film and/or casing pulled therebetween (block 410). A servomotor can be electronically directed to adjust film-seal speed depending on whether too much or too little length of film is measured as dispensed based on the measuring wheel (block 420).

The wheel and wheel saddle can cooperate to provide an accurate measurement length of casing pulled forward during successive voiding operations (block 412).

The servomotor can create an instantaneous increase and/or decrease in casing/film drive speed to temporarily produce additional or less, respectively, heat-seal casing/film to thereby produce sufficient casing/film for use (block 420).

The creating step can be carried out without producing excess tubular casing/film to avoid creating or adding to a buffer (block 422). Where used, the buffer can be relatively short, e.g., between about 1-2 inches that can be created at the beginning or at different defined times for a single supply of roll stock.

At least one clip can be applied to at least one end portion(s) of a filled length of the sealed casing/film to thereby seal an end of the filled tubular package (block 425).

Figure 9:
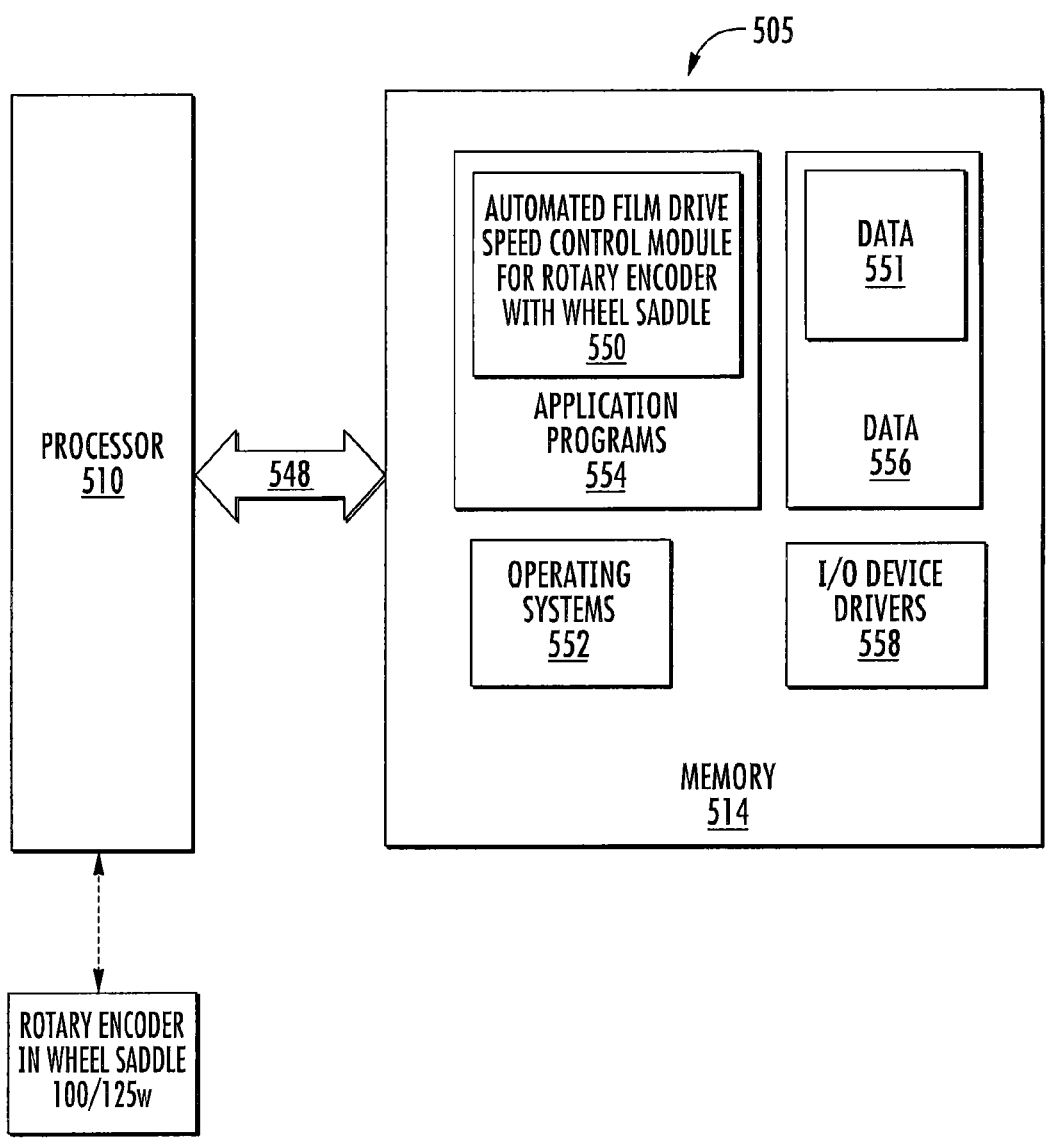
FIG. 9 is a block diagram of a data processing system according to embodiments of the present invention.

FIG. 9 is a block diagram of exemplary embodiments of data processing systems 505 in accordance with embodiments of the present invention. The processor 510 communicates with the memory 514 via an address/data bus 548. The processor 510 can be any commercially available or custom microprocessor. The memory 514 is representative of the overall hierarchy of memory devices containing the software and data used to implement the functionality of the data processing system 505. The memory 514 can be non-transitory, and can include, but is not limited to, the following types of devices: cache, ROM, PROM, EPROM, EEPROM, flash memory, SRAM, and DRAM.

As shown in FIG. 9, the memory 514 may include several categories of software and data used in the data processing system 505: the operating system 552; the application programs 554; the input/output (I/O) device drivers 558; an Automated Film Drive Control For Rotary Encoder with Wheel Saddle Module 550 and the data 556.

The data 556 may include a look-up chart of different casing run times (i.e., for tubular elastomeric (polymer) casings formed in situ, as well as the product, filling rates, selectable chain lengths and link lengths and the like corresponding to particular or target products for one or more producers.

As will be appreciated by those of skill in the art, the operating system 552 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 558 typically include software routines accessed through the operating system 552 by the application programs 554 to communicate with devices such as I/O data port(s), data storage 556 and certain memory 514 components. The application programs 554 are illustrative of the programs that implement the various features of the data processing system 505 and preferably include at least one application which supports operations according to embodiments of the present invention. Finally, the data 556 represents the static and dynamic data used by the application programs 554, the operating system 552, the I/O device drivers 558, and other software programs that may reside in the memory 514.

While the present invention is illustrated, for example, with reference to the Module 550 being an application program in FIG. 9, as will be appreciated by those of skill in the art, other configurations may also be utilized while still benefiting from the teachings of the present invention. For example, the Module 550 may also be incorporated into the operating system 552, the I/O device drivers 558 or other such logical division of the data processing system 505. Thus, the present invention should not be construed as limited to the configuration of FIG. 9, which is intended to encompass any configuration capable of carrying out the operations described herein.

The I/O data port can be used to transfer information between the data processing system 505 or another computer system or a network (e.g., the Internet) or to other devices controlled or directed by the processor 510. These components may be conventional components such as those used in many conventional data processing systems which may be configured in accordance with the present invention to operate as described herein.

For example, the data processing system 505 can be a computer program product with computer readable program code configured to provide a plurality of different predetermined operational modes. In particular embodiments, the computer readable program code is configured to accept user input to identify the type of casing material selected for deployment and/or a selection of the size of the horn or tubular casing. In addition, the computer readable program code can be configured to inhibit operation until the door of the machine is closed.

In addition, the computer readable program code can be configured to automatically identify when a casing supply is exhausted. For example, the computer readable program code can be configured to monitor and/or detect when a limit switch is triggered responsive to force applied to a lead attached to a trailing edge portion of the supply of casing material as the trailing edge portion of the casing material advances.

While the present invention is illustrated, for example, with reference to particular divisions of programs, functions and memories, the present invention should not be construed as limited to such logical divisions. Thus, the present invention should not be construed as limited to the configuration of FIG. 9 but is intended to encompass any configuration capable of carrying out the operations described herein.

The operation and sequence of events can be controlled by a programmable logic controller. The operational mode can be selected by an operator input using a Human Machine Interface to communicate with the controller as is well known to those of skill in the art.

The flowcharts and block diagrams of certain of the figures herein illustrate the architecture, functionality, and operation of possible implementations of selective implementation of single and dual clip closure means according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

FIGS. 10A and 10B are comparative graphs of mm vs. time (ms) of encoder-measured film length used per cycle. FIG. 10A illustrates the measurement without the wheel saddle and FIG. 10B illustrates the measurements with the wheel saddle. The length measurements were obtained using the same encoder, the same measuring wheel, the same packaging machine, the same film material, and the same horn size over successive cycles (e.g., successive voiding/clipping operations), the only change being to place the wheel saddle on the horn for the measurements in FIG. 10B. To obtain the measurements, the packaging system 10 was run a few minutes to get a good average with the wheel saddle 100 in place under the encoder wheel 125w. Then, the saddle 100 was moved upstream about 2½ inches on the fill tube/horn and the system was run the same as before, but with the encoder wheel 125w resting on the film on the round fill tube/horn. Other testing was carried out to confirm accurate counts were obtained from that encoder 125.

FIG. 10B shows that the measurements with the wheel saddle 100 can have a larger (mm) value per cycle (between 248 mm and 260 mm) while the measurements without the wheel saddle measured lower amounts of film, on average, between 224 mm and 248 mm.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for controlling a packaging apparatus, comprising:
   automatically pulling casing between the outer perimeter of a measuring wheel of a rotary encoder and a depression of a cooperating wheel saddle having an inwardly curved shape formed in the exterior surface of the wheel saddle to receive the outer perimeter of the rotary measuring wheel in the direction of the depression, the depression having a radius of curvature corresponding to the radius of the outer perimeter of the measuring wheel; and
   automatically measuring a length of casing pulled between the outer perimeter of the measuring wheel and the depression of the cooperating wheel saddle based on the rotation of the measuring wheel.

2. The method of claim 1, wherein the wheel saddle having an outer circumference, and the radius of curvature of the at least one depression is transverse to the exterior circumference of the wheel saddle.

3. The method of claim 1, wherein the wheel saddle is an integral component of a tubular product horn.

4. The method of claim 1, wherein the wheel saddle is removably secured to an external surface of a tubular product horn and resides inside a tubular casing.

5. A method for controlling a packaging apparatus, comprising:
   automatically pulling casing between a measuring wheel of a rotary encoder and a depression of a cooperating wheel saddle having an inwardly curved shape with a radius of curvature;
   automatically measuring a length of casing pulled between the measuring wheel and the depression of the cooperating wheel saddle based on an output from the rotary encoder; and
   wherein the wheel saddle is a tubular body with a plurality of circumferentially spaced apart depressions, and wherein the method further comprises rotating the tubular body held on a product horn to present a different one of the depressions to be in cooperating alignment with the measuring wheel.

6. A method for controlling a packaging apparatus, comprising:
   automatically pulling casing between a measuring wheel of a rotary encoder and a depression of a cooperating wheel saddle having an inwardly curved shape with a radius of curvature;
   automatically measuring a length of casing pulled between the measuring wheel and the depression of the cooperating wheel saddle based on an output from the rotary encoder; and
   before the automatically pulling step,
      forming tubular casing from flat roll stock;
      sealing long edges of the tubular casing together; and
      automatically advancing the sealed tubular casing using a film drive assembly with drive belts.

7. The method of claim 6, wherein the film drive assembly is powered by at least one servomotor, and wherein the method further comprises electronically directing the at least one servomotor to adjust film-drive speed based on the measured length of casing.

8. The method of claim 6, further comprising voiding then applying at least one clip to segments of the tubular casing using an automated clipper having a voider assembly for providing a voiding operation on tubular packaging prior to applying the at least one clip.

9. An apparatus for packaging products using tubular casings formed from flat roll stock for encasing products therein, comprising:
   a frame;
   a horn releasably secured to the frame;
   a wheel saddle with at least one depression on the horn;
   a forming collar residing about the horn, the forming collar configured to cooperate with a roll of flat casing material to force the flat casing material to take on a shape with long edge portions of the casing material residing proximate each other;

a seal assembly held a longitudinal distance in front of the forming collar in cooperating alignment with the horn;

a film drive system residing proximate the seal assembly in communication with the horn;

a controller in communication with the film drive system; and at least one rotary encoder with a measuring wheel residing against the depression of the wheel saddle in communication with the controller, wherein the controller is configured to adjust a speed of the film drive system to increase or decrease the film-drive speed based on data from the rotary encoder.

10. The apparatus of claim 9, wherein the film drive system comprises at least one servomotor, and wherein the rotary encoder measuring wheel and the wheel saddle reside upstream of the forming collar.

11. The apparatus of claim 9, wherein the wheel saddle is part of or is releasably secured to the horn and has a lip that defines a casing sizing ring.

12. The apparatus of claim 9, wherein the wheel saddle is a tubular body with an open through channel that resides over an outer surface of the horn in a fixed longitudinal position.

13. The apparatus of claim 12, wherein the horn, wheel saddle and forming collar are provided in different diameter sizes to releasably, serially and interchangeably secure to the frame.

14. The apparatus of claim 9, wherein the depression of the wheel saddle has an inwardly curved surface with a radius of curvature that corresponds to a radius of an outer perimeter of the measuring wheel residing thereagainst.

15. The apparatus of claim 9, wherein the wheel saddle comprises a plurality of circumferentially spaced apart depressions, each having a common size and shape with a radius of curvature that corresponds to a radius of an outer perimeter of the measuring wheel residing serially and interchangeably thereagainst.

16. The apparatus of claim 9, further comprising a clipper with a voider assembly residing upstream of the wheel saddle depression and measuring wheel proximate a discharge end of the horn.

17. The apparatus of claim 9, wherein the at least one depression has a solid closed surface with an inward curved shape with a longitudinal length that is between about 1 inch to about 2.5 inches.

18. The apparatus of claim 9, wherein the wheel saddle has a leading end which, in a longitudinally extending direction, tapers up to a casing sizing lip then steps down before the at least one depression, and wherein the at least one depression curves inward corresponding to a curvature of an outer perimeter of the measuring wheel held therein.

19. The apparatus of claim 9, wherein the controller comprises computer program product for operating the packaging apparatus that can accommodate different casing materials and different horn diameters to provide encased elongate products, the computer program product comprising:

a non-transitory computer readable storage medium having computer readable program code embodied in said medium, said computer-readable program code comprising:

computer readable program code configured to provide a plurality of different predetermined operational modes for an apparatus that releasably mounts different diameter horns and respective different size forming collars to supply different sized tubular casings from flat roll stock;

computer readable program code configured to monitor or detect a signal from a rotary encoder having a measuring wheel that resides in a depression of a wheel saddle on a product horn residing upstream of a film drive assembly having at least one servomotor that powers the film drive assembly; and computer readable program code configured to direct at least one servomotor to increase or decrease film speed relative to an immediately prior film speed based at least in part on the signal from the rotary encoder.

20. A wheel saddle for a packaging system, comprising:

a longitudinal tubular body with opposing ends and at least one depression extending lengthwise of the longitudinal tubular body and transverse to the outer circumference of the tubular body, and having an inward curved shape with a radius of curvature that is between about 1-2 inches measured from a center drawn in space that is radially outward from the tubular body.

21. A wheel saddle for a packaging system, comprising:

a tubular body with longitudinally opposing ends and at least one depression having an inward curved shape with a radius of curvature that is between about 1-2 inches measured from a center drawn in space that is radially outward from the tubular body; and wherein the wheel saddle has a leading end which, in a longitudinally extending direction, tapers up to a casing sizing lip then steps down before the at least one depression, and wherein the at least one depression curves inward corresponding to a curvature of an outer perimeter of the measuring wheel held therein.

22. A wheel saddle for a packaging system, comprising:

a tubular body with longitudinally opposing ends and at least one depression having an inward curved shape with a radius of curvature that is between about 1-2 inches measured from a center drawn in space that is radially outward from the tubular body; and wherein the at least one depression is a plurality of circumferentially depressions, each having a solid closed surface with the inward curved shape with a longitudinal length that is between about 1 inch to about 2.5 inches.

* * * * *